Patented Jan. 16, 1945

2,367,366

UNITED STATES PATENT OFFICE 2,367,366

MANUFACTURE OF AMINES BY VAPOR PHASE AMINATION OF ALDEHYDES

John F. Olin, Grosse Ile, and James F. McKenna, Wyandotte, Mich., assignors to Sharples Chemicals Inc., Philadelphia, Pa., a corporation of Delaware No Drawing. Application January 28, 1942, Serial No. 428,548

8 Claims. (Cl. 260—583)

The present invention pertains to vapor phase amination of aliphatic aldehydes. It is known that, when an aldehyde is passed in vapor phase over a hydrogenating catalyst in admixture with hydrogen and an aminating agent consisting of ammonia or an aliphatic amine having a hydrogen atom attached to the nitrogen of the amine which is capable of being replaced by an alkyl radical, the aminating agent and hydrogen react with the aldehyde to form an amine. While the process is of general applicability in the amination and hydrogenation of aldehydes and ketones, it has been noted that the yields and conversions obtained by practicing such a process in the known manner, by first admixing the reactants and then passing the resulting mixture over the hydrogenation catalyst at the reaction temperature, are not so favorable in cases of manufacture of amines from aldehyes as they are in cases in which ketones are subjected to the reaction.

The present invention rests upon the discovery that, by avoiding contact of the aldehyde with the ammonia or aliphatic amine used as aminating agent until these reactants are in contact with the hydrogenation catalyst and with hydrogen, thus mixing these reactants together in the presence of this catalyst and hydrogen and then effecting amination by passing them over the catalyst together with hydrogen, very substantially improved yields and conversions are obtained as compared to prior art practice involving admixture of the reactants before they reach the heated catalyst. The preferred range of temperatures for accomplishment of the reaction are the temperatures heretofore used in effecting condensation reactions of this type, and are usually between 100 and 200° C., depending upon the particular aldehyde under treatment, the catalyst, the aminating agent and the space velocity.

The feature of having a hydrogenation catalyst as well as hydrogen present at the zone of initial contact between the aldehyde and aminating agent may be usefully employed under all conditions as to temperature, space velocity, specific hydrogenation catalyst, etc., which have heretofore been used in analogous prior art reactions in which the reactants are premixed in the absence of the catalyst. In all such cases, considerably improved yields are obtained by having the hydrogen and hydrogenation catalyst present at the initial zone of admixture. While the invention may be practiced by introducing the hydrogen to the mixing zone as a separate stream, it is best that the hydrogen be mixed either with the aldehyde or the aminating agent before the aminating agent and aldehyde are brought together. While we do not wish to be limited as to any theory concerning the reasons underlying the success of our invention, it is believed that, by providing both hydrogen and a hydrogenation catalyst at the very beginning of the contact between the aminating agent and aldehyde, the desired reaction is favored, and undesirable side reactions resulting in decreased yield are correspondingly minimized. It may be, also, that the hydrogenation catalyst has an actual depressing effect upon the undesired reactions.

In the preferred practice of the invention, the aldehyde, aminating agent and hydrogen are mixed with each other at a temperature substantially below the maximum temperature attainable during the course of the aminating reaction by which the ammonia and hydrogen react with the aldehyde to form the desired amine. Thus, it is desirable that the reactants be mixed in the presence of the hydrogenation catalyst (such as the metallic hydrogenation catalyst; e. g., nickel or copper) at a temperature below 120° C. and that the mixture be thereafter heated to a temperature in excess of 140° C. in the presence of the catalyst, in order to promote the desired reaction. Still better results can be attained by conducting the initial mixing at a still lower temperature, and the very best results have been attained in cases in which this initial mixing is accomplished at a temperature below 100° C., and the reaction mixture is thereafter heated, in contact with the catalyst, to a temperature above 150° C.

The following examples illustrate the practice of the invention:

Example I

During a period of 5 hours, 7.68 moles (553.0 grams) of butyraldehyde was vaporized in the presence of 23.8 moles (47.6 grams) of hydrogen and passed into 194 cc. of pelleted nickel hydrogenation catalyst and into contact with 18.7 moles (318 grams) of ammonia separately introduced in vapor phase into the catalyst-containing chamber. The catalyst was maintained at an average temperature of 179.5° C., while the space velocity was calculated to be 1160. Upon working up the reaction product by acidifying the amine, wet distilling the neutral material, making the residue basic by addition of an excess of 50% caustic and fractionating the amines formed in the reaction, there was recovered 15.5 grams of wet butanol boiling between 86 and 96° C., 133.2 grams of mono-butylamine (96% by titration), 266.0 grams of dibutylamine (95% by titration) and 81.2 grams of tributylamine. Upon correcting for the purity of the products the following conversions were obtained in the reaction: Butylamine, 22.7%; dibutylamine, 51.2%; tributylamine, 17.0%; butanol, 2.7%; butyraldehyde recovered, none. The total amine conversion is thus 90.9%.

Example II 8.95 moles (644.4 grams) of butyraldehyde were vaporized in the presence of 29.8 moles (49.6 grams) of hydrogen and mixed with 24.0 moles (408 grams) of ammonia in the presence of 194 cc's of a pelleted nickel on kieselguhr catalyst maintained at an average temperature of 154.7° C. Since the reaction was completed at the end of four hours the space velocity is calculated as 1815. Upon working up the reaction product by the acidification method there was found to have been formed 20.7 grams of butanol (boiling from 85 to 96° C.), 6.5 grams of neutral polymer, 188.5 grams of mono-butylamine of 95% purity (by titration), 284.3 grams of 95% dibutylamine and 78.0 grams of tributylamine. The conversions and yields were: butylamine, 27.4%; dibutylamine, 46.7%; tributylamine, 13.6% and butanol 3.1%. The total amine conversion was 87.7%.

Example III 7.46 moles (328 grams) of acetaldehyde was vaporized by passage of a stream of hydrogen through it. This acetaldehyde-hydrogen vapor stream was joined at the reactor by a second stream containing a mixture of hydrogen and ammonia. In this manner the acetaldehyde was reacted in the presence of 19.1 moles (325 grams) of ammonia and 23.3 moles (46.6 grams) of hydrogen. The 194 cc. of pelleted nickel on silica catalyst was maintained at an average temperature of 150° C. with a space velocity of 1150 being employed. Upon working up the reaction product by use of acidification technique there was obtained a 30.3% conversion to ethylamine, a 47.8% conversion to diethylamine, a 10.6% conversion to triethylamine and a 2.1% conversion to ethanol plus a few grams of neutral polymer. The total amine conversion was thus 88.7%.

Example IV 5.07 moles of butyraldehyde were vaporized in the presence of 18.2 moles of hydrogen and mixed with 15.0 moles of ammonia in the presence of a pelleted nickel hydrogenation catalyst at room temperature. The resulting mixture was passed through a heated tube containing the nickel catalyst until it reached a temperature of 177° C., the space velocity being 1170. In this experiment, there was obtained a yield of 24.4% mono-butyl amine, 46.3% dibutyl amine, and 14.1% tributyl amine, making a total yield of 84.8%. At the same time, there was obtained a conversion of 1.4% of the aldehyde to butyl alcohol, and 13.8 grams of undesired polymerized material were obtained. In an experiment which was analogous to the above, except for the fact that no catalyst was present at the zone of initial admixture of the stream of butyraldehyde and hydrogen with the stream of ammonia, the conversion to amines was reduced to 61.3%, 10.6% of butyl alcohol was obtained, and 88.0 grams of undesired polymerized material were produced.

Modifications will be obvious to those skilled in the art, and we do not therefore wish to be limited except by the scope of the sub-joined claims.

We claim:

1. In the manufacture of an aliphatic amine by vapor phase reaction of an aliphatic aldehyde with an aminating agent chosen from the class consisting of ammonia and aliphatic amines and with hydrogen, the process comprising introducing the aldehyde and the aminating agent separately into contact with a body of hydrogenation catalyst maintained in a reaction zone, by passage of separate vapor phase streams of the aldehyde and aminating agent into contact with said catalyst and confluence with each other in the presence of said hydrogenation catalyst and hydrogen, whereby the initial mixing between said aldehyde and aminating agent occurs in the presence of said catalyst and of hydrogen, and thereafter continuing the passage of the resulting mixture through said reaction zone in vapor phase in contact with hydrogen and said hydrogenation catalyst to effect the desired amination reaction.

2. In the manufacture of an alphatic amine by vapor phase reaction of an aliphatic aldehyde with an aminating agent chosen from the class consisting of ammonia and aliphatic amines and with hydrogen, the process comprising mixing the aldehyde with hydrogen and thereafter introducing the resulting mixture of aldehyde and hydrogen and the aminating agent separately into contact with a body of hydrogenation catalyst maintained in a reaction zone, by passage of separate vapor phase streams of the aminating agent and of the aldehyde containing the hydrogen into contact with said catalyst and confluence with each other in the presence of said hydrogenation catalyst, whereby the initial mixing between said aldehyde and aminating agent occurs in the presence of said catalyst and of hydrogen, and thereafter continuing the passage of the resulting mixture through said reaction zone in vapor phase in contact with said hydrogenation catalyst to effect the desired amination reaction.

3. In the manufacture of an aliphatic amine by vapor phase reaction of an aliphatic aldehyde with ammonia and hydrogen, the process comprising introducing the aldehyde and the ammonia separately into contact with a body of hydrogenation catalyst maintained in a reaction zone, by passage of separate vapor phase streams of the aldehyde and ammonia into contact with said catalyst and confluence with each other in the presence of said hydrogenation catalyst and hydrogen, whereby the initial mixing between said aldehyde and ammonia occurs in the presence of said catalyst and of hydrogen, and thereafter continuing the passage of the resulting mixture through said reaction zone in vapor phase in contact with hydrogen and said hydrogenation catalyst to effect the desired amination reaction.

4. In the manufacture of an aliphatic amine by vapor phase reaction of an aliphatic aldehyde with an aminating agent chosen from the class consisting ammonia and aliphatic amines and with hydrogen, the process comprising mixing the aminating agent with hydrogen and thereafter introducing the resulting mixture of aminating agent and hydrogen and the aldehyde separately into contact with a body of hydrogenation catalyst maintained in a reaction zone, by passage of separate vapor phase streams of the aldehyde and of the aminating agent containing the hydrogen into contact with said catalyst and confluence with each other in the presence of said hydrogenation catalyst, whereby the initial mixing between said aldehyde and aminating agent occurs in the presence of said catalyst and of hydrogen, and thereafter continuing the passage of the resulting mixture through said reaction zone in vapor phase in contact with said hydrogenation catalyst to effect the desired amination reaction.

5. In the manufacture of an aliphatic amine by vapor phase reaction of an aliphatic aldehyde with ammonia and hydrogen, the process comprising mixing the aldehyde with hydrogen and thereafter introducing the resulting mixture of aldehyde and hydrogen and the ammonia separately into contact with a body of hydrogenation catalyst maintained in a reaction zone, by passage of separate vapor phase streams of the ammonia and of the aldehyde containing the hydrogen into contact with said catalyst and confluence with each other in the presence of said hydrogenation catalyst, whereby the initial mixing between said aldehyde and ammonia occurs in the presence of said catalyst and of hydrogen, and thereafter continuing the passage of the resulting mixture through said reaction zone in vapor phase in contact with said hydrogenation catalyst to effect the desired amination reaction.

6. In the manufacture of an aliphatic amine by vapor phase reaction of an aliphatic aldehyde with ammonia and hydrogen, the process comprising mixing ammonia with hydrogen and thereafter introducing the resulting mixture of ammonia and hydrogen and the aldehyde separately into contact with a body of hydrogenation catalyst maintained in a reaction zone, by passage of separate vapor phase streams of the aldehyde and of the ammonia containing the hydrogen into contact with said catalyst and confluence with each other in the presence of said hydrogenation catalyst, whereby the initial mixing between said aldehyde and ammonia occurs in the presence of said catalyst and of hydrogen, and thereafter continuing the passage of the resulting mixture through said reaction zone in vapor phase in contact with said hydrogenation catalyst to effect the desired amination reaction.

7. In the manufacture of an aliphatic amine by vapor phase reaction of an aliphatic aldehyde with an aminating agent chosen from the class consisting of ammonia and aliphatic amines and with hydrogen, the process comprising introducing the aldehyde and the aminating agent separately into contact with a body of hydrogenation catalyst maintained in a reaction zone, by passage of separate vapor phase streams of the aldehyde and aminating agent into contact with said catalyst and confluence with each other in the presence of said hydrogenation catalyst and hydrogen in a zone which is maintained at a temperature below 120° C., whereby the initial mixing between said aldehyde and aminating agent occurs in the presence of said catalyst and of hydrogen, and thereafter completing the desired amination reaction by heating the resulting mixture to a temperature in excess of 140° C. while continuing the vapor phase passage thereof through said reaction zone in contact with said hydrogenation catalyst.

8. In the manufacture of an aliphatic amine by vapor phase reaction of an aliphatic aldehyde with an aminating agent chosen from the class consisting of ammonia and aliphatic amines and with hydrogen, the process comprising introducing the aldehyde and the aminating agent separately into contact with a body of hydrogenation catalyst maintained in a reaction zone, by passage of separate vapor phase streams of the aldehyde and aminating agent into contact with said catalyst and confluence with each other in the presence of said hydrogenation catalyst and hydrogen in a zone which is maintained at a temperature below 100° C., whereby the initial mixing between said aldehyde and aminating agent occurs in the presence of said catalyst and of hydrogen, and thereafter completing the desired amination reaction by heating the resulting mixture to a temperature in excess of 150° C. while continuing the vapor phase passage thereof through said reaction zone in contact with said hydrogenation catalyst.

JOHN F. OLIN.
JAMES F. McKENNA.